(12) United States Patent
Nemoto et al.

(10) Patent No.: US 7,837,784 B2
(45) Date of Patent: Nov. 23, 2010

(54) HIGH-CHROMA C.I. PIGMENT RED 254 AND PROCESS FOR PRODUCING THE SAME

(75) Inventors: Hirotsugu Nemoto, Kamisu (JP); Shousaburou Tanaka, Kamisu (JP); Takashi Sato, Kamisu (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 12/309,413

(22) PCT Filed: Jul. 11, 2007

(86) PCT No.: PCT/JP2007/063808

§ 371 (c)(1),
(2), (4) Date: Jan. 16, 2009

(87) PCT Pub. No.: WO2008/010443

PCT Pub. Date: Jan. 24, 2008

(65) Prior Publication Data

US 2009/0241802 A1 Oct. 1, 2009

(30) Foreign Application Priority Data

Jul. 20, 2006 (JP) ............................. 2006-198025

(51) Int. Cl.
*C09B 67/10* (2006.01)
*C09B 67/20* (2006.01)
*C09B 57/00* (2006.01)

(52) U.S. Cl. ..................... 106/498; 546/276.7; 548/452; 548/453

(58) Field of Classification Search ................. 106/498; 546/276.7; 548/452, 453
See application file for complete search history.

(56) References Cited

U.S. PATENT DOCUMENTS 4,992,101 A 2/1991 Jaffe et al.

| | | | |
|---|---|---|---|
| 5,565,578 A | 10/1996 | Bäbler | |
| 6,566,519 B2 * | 5/2003 | Nickel et al. | ................. 544/336 |
| 6,911,075 B2 * | 6/2005 | Grandidier et al. | .......... 106/499 |

FOREIGN PATENT DOCUMENTS

| JP | 64-042482 | 2/1989 |
|---|---|---|
| JP | 01-306474 | 12/1989 |
| JP | 02-040386 | 2/1990 |
| JP | 04-372632 | 12/1992 |
| JP | 06-256677 | 9/1994 |
| JP | 07-286111 | 10/1995 |
| JP | 08-120189 | 5/1996 |
| JP | 2002-030230 | 1/2002 |
| JP | 2006-206759 | 8/2006 |
| WO | WO-03/022847 | 3/2003 |

OTHER PUBLICATIONS

International Search Report dated Aug. 28, 2007, issued on PCT/JP2007/063808.
The Notice of Reasons for Rejection drafted on Jul. 1, 2008, issued for the Japanese patent application.

* cited by examiner

*Primary Examiner*—Anthony J Green
(74) *Attorney, Agent, or Firm*—Edwards Angell Palmer & Dodge LLP

(57) ABSTRACT

The present invention relates to C. I. Pigment Red 254 for coloring, which can color an object to be colored so as to have a higher chroma than that with conventional technology and a production method for easily producing it. For the purpose, the inventors provide the production method for the pigment, wherein the intersection of mass tone $\Delta H^*$ and $\Delta C^*$ of a color coating film in an acrylic-melamine coating test is, on X-Y coordinate plane to which the $\Delta H^*$ is defined as the X-axis and the $\Delta C^*$ is defined as the Y-axis, within the surrounded region determined by specific three equations; and a production method for the pigment provides the production method of the pigment, including a process of heating crude pigment at 100-130° C. for 2-10 hours in an aprotic polar organic solvent which is strongly alkaline.

6 Claims, 1 Drawing Sheet

HIGH-CHROMA C.I. PIGMENT RED 254 AND PROCESS FOR PRODUCING THE SAME

FIELD OF THE INVENTION

The present invention relates to C. I. Pigment Red 254 coloring an object to be colored so as to have a higher chroma than coloring with conventional technology and a production method for it.

BACKGROUND OF THE INVENTION

A typical diketopyrrolo-pyrrolic pigment is C. I. Pigment Red described with a chemical formula as follows.

[Chemical formula 1]

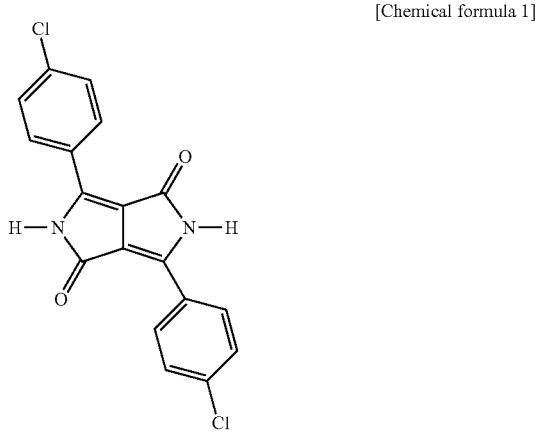

Among red color obtained by C. I. Pigment Red 254, pigments of various hues are known as an indicator with hue angle indicated by yellowish tint and blueish tint. In recent years, C. I. Pigment Red 254 which has stronger blueish tint and higher chroma is desired in the field of color coatings, plastics, and the like. However, the conventional C. I. Pigment Red 254 was insufficient.

Also, it is possible to obtain similar hue to C. I. Pigment Red 254 by toning organic pigments other than C. I. Pigment Red 254; and the chroma of the colored object obtained by toning became low, and no C. I. Pigment Red 254 having excellent chroma under intended hue was obtained.

Formerly, this type of C. I. Pigment Red 254 was produced by heating 1,4-diketo-3,6-bis(4-chlorophenyl)pyrrolo[3,4-c] pyrrole in organic solvent. The 1,4-diketo-3,6-bis(4-chlorophenyl)pyrrolo[3,4-c]pyrrole is a crude pigment obtained synthetically. As an organic solvent in this case, aprotic polar organic solvents of dimethylformamide or dimethylsulfoxide, for example, are known (as refer to Patent Document No. 1).

Also, a production process of C. I. Pigment Red 254 is known, where after crude pigment is added to mixture of methanol and sulfuric acid and is heated; then, this mixture is additionally heated in dimethylacetamide (as refer to Patent Document No. 2).

Also, a production process of opaque C. I. Pigment Red 254 is known, where crude pigment is wet ground by use of grinding medium at 50° C. or below in the presence of base in alcohol (as refer to Patent Document No. 3).

These production processes show either miniaturization in order to be effective particle diameter by grinding crude pigment of extremely large particle diameter, or contrary, regulation in order to be effective particle diameter as colorant by growing crystal of crude pigment with small particle diameter.

However, these production processes do not show intrinsic efficiency of the pigment, and it is hard to say that these production methods of C. I. Pigment Red 254 have excellent quality.

The chroma of C. I. Pigment Red 254 obtained by these production processes was still insufficient.

| Cited Documents | |
|---|---|
| Patent Document No. 1; | Japanese Unexaminded Patent Publication Application No. H04-372632 (page 2 claim, and paragraph [0010]) |
| Patent Document No. 2; | WO 03/022847 A2 (page 27 claim, and page 13 line 15-25) |
| Patent Document No. 3; | Japanese Unexaminded Patent Publication Application No. H01-306474 (page 1 claim, and from page 2 lower right column lowest line to page 3 upper left column line 12) |

DISCLOSURE OF THE INVENTION

Problems to be Solved

The present invention relates to C. I. Pigment Red 254 and provides C. I. Pigment Red 254 which can color an object to be colored with higher chroma than C. I. Pigment Red 254 obtained by the conventional production methods in a predetermined hue range.

Further, the purpose of the present invention is to provide production method of C. I. Pigment Red 254 which is able to color an object to be colored with higher chroma, without grinding medium, with saving load like grinding, and with excellent productivity.

Means for Solving the Problems

The inventors of this invention investigated eagerly a conditioning method in order to have an suitability for colorant with heating crude pigment in aprotic polar organic solvent; they found the described problems to be solved by optimizing feeding method of alkali; and they completed the present invention.

That is, the present invention provides C. I. Pigment Red 254, wherein the intersection of mass tone $\Delta H^*$ and $\Delta C^*$ of a color coating film in an acrylic-melamine coating test described below is within the region surround by three specific equations described below on the X-Y coordinate plane defined the $\Delta H^*$ as the X-axis and the $\Delta C^*$ as the Y-axis, respectively.

[Equation 1]

$$y=7.00x+2.20 \qquad \text{Equation (1)}$$

[Equation 2]

$$y=1.07x+2.20 \qquad \text{Equation (2)}$$

[Equation 3]

$$y=2.32x+1.26 \qquad \text{Equation (3)}$$

Here, $H^*$ and $C^*$ designate a hue angle $H^*$ and a chroma $C^*$ respectively. $\Delta H^*$ and $\Delta C^*$ designate the respective differences from $H^*$ and $C^*$ of a color coating film of C. I. Pigment Red 254 of the present invention, with reference to hue angle $H^*$ 28.9 and chroma $C^*$ 59.8, which are measured values of standard mass tone of a color coating film in the acrylic-melamine coating test set as base, respectively. Each of the equation determines the specific surrounded region which is obtainable with ΔH* and ΔC* when ΔH* is set to be in the range of −0.2 to 0.8 on the X-Y coordinate plane defined ΔH* as the X-axis and ΔC* as the Y-axis.

Also, the present invention provides production method of C. I. Pigment Red 254, wherein, in producing C. I. Pigment Red 254 which has a heating method with 1,4-diketo-3,6-bis(4-chlorophenyl)pyrrolo[3,4-c]pyrrole having mean particle diameter of 0.10 μm or more and less than 0.20 μm in strong alkaline aprotic polar organic solvent at 100-130° C. for 2-10 hours, prior to the heating process, beforehand in neutral or weaker alkaline aprotic polar organic solvent, with a heating process at 100-130° C., with finally mean particle diameter of 0.30-0.80 μm.

EFFECT OF THE INVENTION

C. I. Pigment Red 254 of the present invention can be obtained as C. I. Pigment Red 254, which ΔH* and ΔC* is in specific surrounded region with ΔH* in the range −0.2-0.8 when each value of the ΔH* and the ΔC* which show differences from H* and C* of hue angle H* 28.9 and chroma C* 59.8 of standard mass tone is specified on the X-Y coordinate plane defined ΔH* as the X-axis and ΔC* as the Y-axis. And C. I. Pigment Red 254 of the present invention has a prominent effect with which the work to be colored can have higher chroma than the work to be colored with conventional C. I. Pigment Red 254, particularly.

Moreover, the production method of C. I. Pigment Red 254 according to the present invention comprises the steps of starting conditioning with heating under neutral or weaker alkaline, then conditioning under stronger alkaline, and can obtain pigment with higher chroma and can provide pigment of excellent quality, so it takes extraordinarily prominent effects.

DESCRIPTION OF THE PREFERRED EMBODIMENTS OF THE INVENTION

Figure 1:
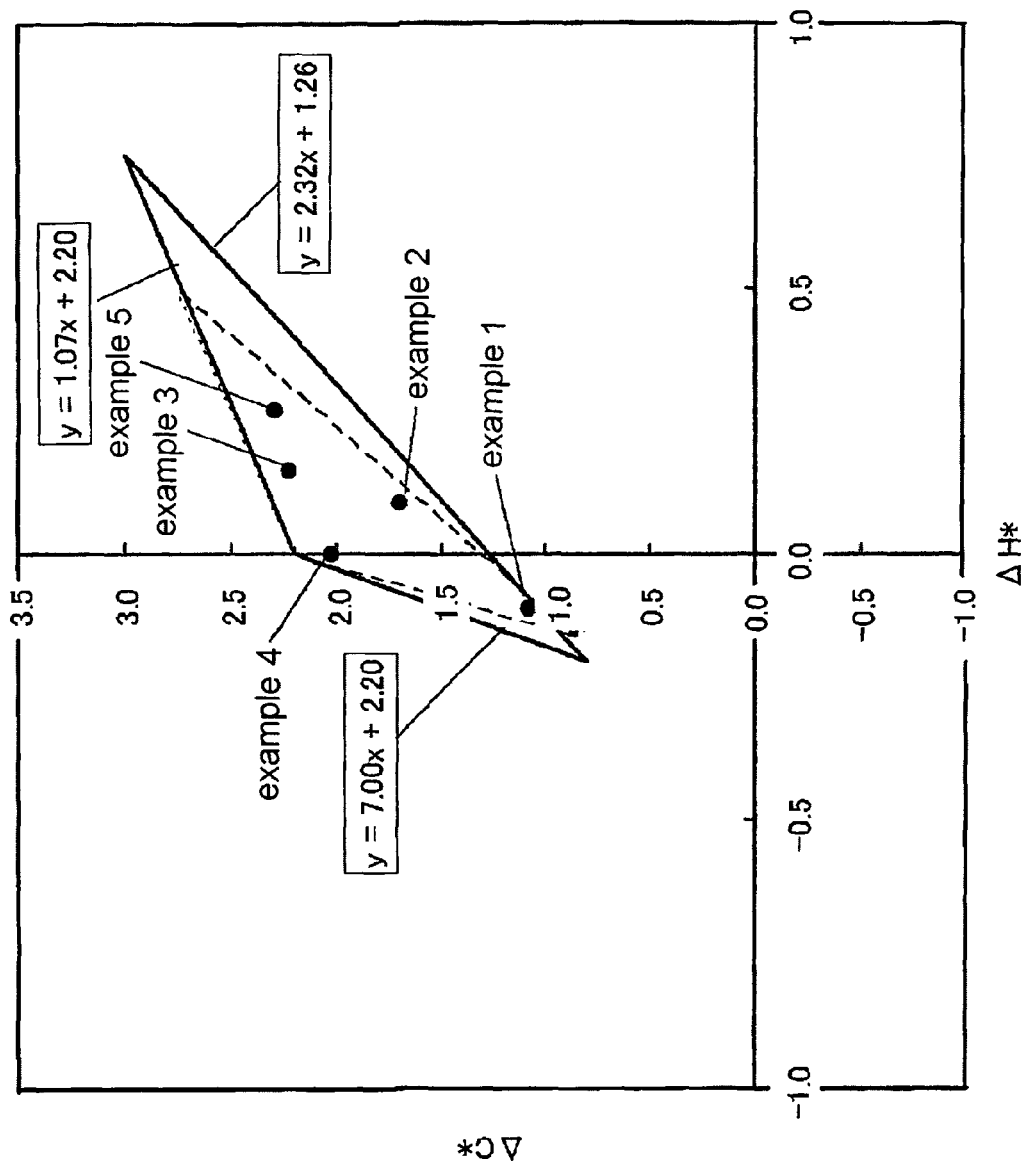
FIG. 1 is a FIGURE showing preferred surrounded region in the present invention determined by equations (1)-(3) (solid lines), and preferred surrounded region determined by equations (4)-(6) (broken lines), and a location of hue angle ΔH* and chroma ΔC* of example 1-5 of the present invention.

C. I. Pigment Red 254 of the present invention is C. I. Pigment Red 254 wherein the intersection of mass tone ΔH* and ΔC* of a colored coating film is within the region surround by next equations (1)-(3) on the X-Y coordinate plane defined the ΔH* as the X-axis and the ΔC* as the Y-axis. In the field of this invention, the hue angle is expressed in H and the chroma in C.

[Equation 1]

$$y=7.00x+2.20 \qquad \text{Equation (1)}$$

[Equation 2]

$$y=1.07x+2.20 \qquad \text{Equation (2)}$$

[Equation 3]

$$y=2.32x+1.26 \qquad \text{Equation (3)}$$

By toning of organic pigments other than C. I. Pigment Red 254 according to the conventional technology, it is possible to obtain the similar hue to C. I. Pigment Red 254, but the chroma becomes low. The present invention provides both C. I. Pigment Red 254 of desired hue and excellent chroma without toning for the first time.

The specific surrounded region corresponds to the high chroma region where no conventional C. I. Pigment Red 254 exists. Because ΔC* becomes smaller, similarly, in case of being ΔH* smaller, it was difficult to obtain color region of the specific surrounded region until now. However, C. I. Pigment Red 254 which is in the specific surrounded region can be obtained by the production method according to the present invention described below.

However, C. I. Pigment Red 254 according to the present invention is more preferable within the specific surrounded region, and at the same time within the following specific surrounded region.

[Equation 4]

$$y=9.00x+2.20 \qquad \text{Equation (4)}$$

[Equation 5]

$$y=1.10x+2.20 \qquad \text{Equation (5)}$$

[Equation 6]

$$y=2.92x+1.29 \qquad \text{Equation (6)}$$

Each surrounded region is defined by the hue angle and the chroma of a color coating film in an acrylic-melamine coating test of a pigment. The acrylic-melamine coating of the pigment can be prepared by mixing pigment, acrylic resin, melamine resin and solvent, then dispersing mixed to uniform state. The ending point of the pigment dispersing is, while beforehand dispersing under a constant condition and sampling with time, the point where the hue angle and the chroma of the acrylic-melamine coating are saturated (being constant) and the values are changed no more. ΔH* and ΔC* are found easily by measuring color of the color coating film with commercial spectrophotometer which is drawn down so as to obtain predetermined dry film thickness on a object to be colored of paper or of film and the like, and then dried and baked, for example, with commercial spectrophotometer, and by comparing the colored coating film with the standard as a pair.

In addition, H* and C* of mass tone can be obtained from the colored coating film directly, but in the present invention, ΔH* and ΔC* are adopted because they are a set of data to deal with easier and to be affected more hardly of errors in measurement. Each value of ΔH* and ΔC* shows the differences from the standards. In the present invention, in order to find each value of ΔH* and ΔC* in pigments concerning measured object, values of the hue angle H* 28.9 and the chroma C* 59.8 were made standard values, respectively.

In FIG. 1, the locations of ΔH* and ΔC* of the examples 1-5 of the present invention were shown. In FIG. 1, the surrounded region determined by equations (1)-(3) is shown which determines preferable pigments in the present invention, and inside of the surrounded region is specific surrounded region determined by equations (4)-(6). On the coordinate plane, by centering around the origin, minus direction along the X-axis concerning ΔH* is the direction of stronger blueish tint in red color; on the other hand, plus direction along the Y-axis concerning ΔC* is the direction of higher chroma.

The coordinates to determine the specific surrounded region may scales at regular intervals with the ordinate and the abscissa. However, the scale of the abscissa may be finer than that of the ordinate in order to recognize more clearly the specific surrounded region. In case of a kind of pigment as object, as the width of possible value of ΔH* concerning the hue angle is smaller than that of possible value of ΔC* concerning the chroma, the difference of 0.1 in ΔH* is quite different in technical meaning from the difference of 0.1 in ΔC* concerning the chroma.

C. I. Pigment Red 254 of the present invention, which ΔH* and ΔC* is in the specific surrounded region, has no limitation with the particle diameter so far as the particle diameter functions as colorant. The mean particle diameter is 0.30-0.80 µm, and is preferably 0.40-0.70 µm.

The mean particle diameter is the average value of each value obtained by the steps in which particles in visual field are photographed with transmittance electron microscope JEM-2010 (made by Nihon Denshi co. ltd), then each longer diameters (the major diameters) are found with 50 pigments of primary particles forming the flocculate in two dimensional image, respectively. On this occasion, the pigment particles of the present invention as samples are photographed by the electron microscope after ultra-sonic dispersing of the pigment particles in solvent. Also, scanning electron microscope may be used instead of transmittance electron microscope.

C. I. Pigment Red 254 of the present invention, which ΔH* and ΔC* are in the specific surrounded region, can be obtained, for example, by conditioning 1,4-diketo-3,6-bis(4-chlorophenyl)pyrrolo[3,4-c]pyrrole having the mean particle diameter of 0.10 µm or more and less than 0.20 µm (what is called crude pigment) in predetermined condition.

Formerly, to make the crude pigment having functional particle diameter as the colorant is well known by heating the crude pigment at a predetermined temperature and for a predetermined time in an aprotic polar organic solvent of strong alkaline. However, just only by heating crude pigment in the aprotic polar organic solvent of strong alkaline, the chroma C* in the extent of predetermined hue angle H* could not achieve the effect of the present invention. Moreover, the dispersion of particle diameter, particle shape, and particle size distribution concerning the crude pigment for the colorant was sometimes large. Thus, the inventors, in order that crystal growth may be regulated sufficiently and the obtained C. I. Pigment Red 254 may have high chroma, instead of just only heating crude pigment in the aprotic polar organic solvent of strong alkaline, found the conditioning method in which the crude pigment might beforehand be heated in neutral or weak alkaline, and particle diameter, particle shape, particle size distribution and the like of the crude pigment itself were beforehand made as uniform as possible, then the crude pigment was heated in strong alkaline. This production method was aimed at removing troubles of produced pigment as represented by chroma which was caused just only by heating the crude pigment in aprotic polar organic solvent of strong alkaline.

The production method of C. I. Pigment Red 254 according to the present invention is the production method of C. I. Pigment Red 254, wherein, in producing C. I. Pigment Red 254 which has heating process with 1,4-diketo-3,6-bis(4-chlorophenyl)pyrrolo[3,4-c]pyrrole in strong alkaline aprotic polar organic solvent at 100-130° C. for 2-10 hours, wherein, prior to the heating process, beforehand in neutral or weaker aprotic polar organic solvent, heating process is taken at 100-130° C., with final mean particle diameter larger than the particle diameter before heating.

In the present invention, as 1,4-diketo-3,6-bis(4-chlorophenyl)pyrrolo[3,4-c]pyrrole, all of well-known and conventional ones may be used. The mean particle diameter is smaller than the pigment, and 1,4-diketo-3,6-bis(4-chlorophenyl)pyrrolo[3,4-c]pyrrole (what is called crude pigment), for example, of the mean particle diameter 0.10 µm or larger and less than 0.20 µm. This kind of crude pigment may be produced, for example, by reacting 1 mol of diester succinate and 2 mol of benzonitrile and the like in organic solvent in the presence of strong base like metal alcoholate, and by hydrolyzing the reacted product with water or with acid. There is no difference between crude pigment and pigment in chemical structure, and they are both expressed as the chemical formula 1.

The state of the crude pigment is not limited, and the crude pigment may be used in various forms of, for example, dry state such as dry powder, dry granule and the like, wet state such as wet cake, aqueous slurry and the like. Water pH in which crude pigment in dry state is immersed, or liquid medium which contains crude pigment in the wet state, is preferable neutral or weak alkaline, because the quantity of alkaline metal hydroxide can be more reduced for making the aprotic polar organic solvent required for heating the same basicity as target.

The crude pigment is preferable in wet state as wet cake or aqueous slurry without drying history. If the liquid medium which humidifies crude pigment may be as water, pH can be calculated, and the basicity of the system at the beginning of conditioning described below can be determined. The crude pigment is made dry state after wet state. Once drying process is performed, the crude pigment causes easily strong flocculation, pigment particles can hardly deflocculate by conditioning, and they require more energy for deflocculation. Therefore, drying is not preferable not only for chroma, but also for productivity.

The crude pigment in the present invention is heated in aprotic polar organic solvent. As the aprotic polar organic solvent, N,N-dimethylformamide, N,N-dimethylacetamide, N-methylpyrrolidone, N-methylformamide, N,N'-dimethyl-1,3-imidazolidine, dimethylsulfoxide, acetonitrile and the like may be cited for example. The aprotic polar organic solvents may be used singly, or mixed with two or more. Hydrophilic nitrogen-containing organic solvent like N,N-dimethylformamide, N-methylpyrrolidone are preferable, because of their high safety and appropriate affinity for water. Organic solvents like N-methylpyrrolidone, which has hydrophilic nitrogen-containing heterocyclic ring, are the most preferable because they can easily grow crystal to the desired size.

The quantity of use of the aprotic polar organic solvent in the present invention is not limited in particular, and 100-5,000 parts per 100 parts of crude pigment in mass conversion, for example, may be applied, or especially 500-2,000 parts may be applied preferably, because mixture of the crude pigment, the aprotic polar organic solvent and alkaline described below come to have comparatively low viscosity, can be stirred with low shear, so the crude pigment may be heated uniformly easily without being ground.

In addition, the aprotic polar organic solvents containing alkaline metal hydroxide are preferable to be in anhydrous state, but may contain a little water unavoidably. The content of the water is preferable as little as possible in the range beyond 0 to 50 parts or less per 100 parts of the aprotic polar organic solvents in mass conversion.

In the present invention, conditioning is performed concerning liquid property of the aprotic polar organic solvent heating with changing basicity from neutral to strong alkaline. For adjusting the liquid property, various kinds of alkalis may be used. As the alkalis, inorganic water-soluble alkalis soluble in aprotic polar organic solvent above described are preferable. Preferable alkalis in the present invention are alkaline metal hydroxides and a recited, for example, sodium hydroxide, potassium hydroxide, lithium hydroxide and the like. The alkaline metal hydroxides may be used in an arbitrary form such as a simple substance, or solution and the like. Deliquescent alkaline metal hydroxides contain usually a little water.

As the aprotic polar organic solvent is not water, the liquid property can not be expressed by pH. Therefore, for instance, in case of water which is previously humidifying the crude pigment, the liquid property of the aprotic polar organic solvent can be controlled by substituting pH for the starting point of conditioning by the amount of alkali, as from neutral to weak alkaline, then from weak alkaline to strong alkaline. Namely, alkali is so added to the aprotic polar organic solvent in order to make the basicity of the object to be heated higher than that before alkali is added. N-methylpyrrolidone is weak alkaline itself, weak alkaline in the state at the starting time of heating when alkali is not contained, then the basicity increases with addition of alkali and reaches strong alkaline. The amount of use of alkali may be adjusted at need according to the condition of final use, mass of crude pigment, kind of solvents and the like.

The inventors found, thus by optimizing the feeding method of alkali and by heating crude pigment in aprotic polar organic solvent, that C. I. Pigment Red 254 of high chroma appropriate for coloring medium to be colored can be obtained in this way.

In the production method of C. I. Pigment Red 254 according to the present invention, conditioning is started with heating in weaker alkaline, then conditioning in stronger alkaline with addition of alkali into the system successively, so the pigment of high chroma can be obtained and pigment of excellent quality can be produced.

The previous conditioning in the present invention prior to heating in the aprotic polar organic strong alkaline solvent can be performed in an aprotic polar organic solvent containing 0.00-0.20 parts of alkali metal hydroxide, preferably 0.00-0.07 parts of alkali metal hydroxide per 100 parts of the aprotic polar organic solvent in mass conversion. In the next conditioning in the aprotic polar organic strong alkaline solvent, 0.01-0.20 parts, or preferably 0.02-0.15 parts of alkali metal hydroxide per 100 parts of aprotic polar organic solvent in mass conversion can be added. The alkali supplement addition after prior conditioning may set total fed alkaline amount after prior conditioning in a lump, or addition intermittently divided into several, or addition in successively.

Heating of mixture containing the crude pigment, the aprotic polar organic solvent, and alkali is preferable with stirring in order to set the mixture to be heated more uniformly. Heating of crude pigment in the aprotic polar organic solvent containing alkali together with the prior conditioning and conditioning by heating in strong alkaline aprotic polar organic solvent after that may be performed selective of pressurization or non-pressurization at need, at 70-140° C., for example, preferably 100-130° C. Also, heating time may be, for example, 1-15 hours, preferably 3-7 hours.

The period of adding alkali is preferable, in order to make additional effect maximize, from one hour after the start of heating to one hour before the finish of heating. It is most preferable to perform prior conditioning at 100-130° C. for 2-10 hours, then to perform conditioning by heating in strong alkaline aprotic polar organic solvent after that, on the whole, in the range at 100-130° C. and for 3-7 hours.

The heating in conditioning, for example, by sampling with time, measuring particle diameter and the chroma concerning the obtained pigment, and by finding a relation between the heating time and the particle diameter or the chroma previously, may be finished at the finishing point at which predetermined properties are obtained. This method enables properties of obtained pigment to be controlled by heating time. Of course, the heating with heating temperature and heating time most suitable adjusted to actual condition depending on the content of the alkaline metal hydroxide contained in the aprotic polar organic solvent is desirable to be set up each time.

The heating is usually so performed that the particle size becomes relatively larger than the particle size of the crude pigment before the heating. Thus, by the heating, the pigment of mean particle diameter, for example, of 0.30-0.80 µm, or preferable 0.40-0.70 µm can be obtained.

Thus, obtained aprotic polar organic solvent containing C. I. Pigment Red 254 can be made the wet cake of C. I. Pigment Red 254, for example, by filtering after cooling then washing the obtained wet cake with organic solvent or with water. Further, by drying the wet cake additionally and by pulverizing with classifying at need, the granular or powdered dry C. I. Pigment Red 254 can be made.

The production method of the present invention described in detail in this way is a preferable production method for producing C. I. Pigment Red 254, which color has blueish tint in red color more stronger and, which chroma, is higher than C. I. Pigment Red 254 of conventional standard, and which, in other words, locates at the upper left of the second quadrant on the X-Y coordinate plane prescribed by $\Delta H^*$ and $\Delta C^*$. The production method of the present invention is the preferable production method for producing C. I. Pigment Red 254 which is in the specific surrounded region, and especially the most preferable production method for producing C. I. Pigment Red 254 which is in the specific surrounded region, and at the same time, in the surrounded region determined by equations (4)-(6). However, the production method of the present invention can also apply to the production of C. I. Pigment Red 254 which deviates from the specific surrounded region.

The pigment obtained by the production method of the present invention is excellent in tinctorial strength and can be used in various forms of, for example, colored plastic moldings, colored varnishes, oil or water-borne coatings, printing inks, lacquer and the like. Hiding power is one of the measures of estimating tinctorial strength in coatings or inks. The pigment obtained by the production method of the present invention is especially suitable for preparing coatings for automobile, as it has high chroma and is capable of developing red color having high hiding power. These can be prepared by mixing pigment obtained according to the production method of the present invention, resins described below, fillers, various additives and solvents at need.

The pigment obtained by the production method of the present invention is preferable for colorant of various resins as colored medium. As resins used in this case, for example, natural or synthetic resins, polymerized resins or condensed resins, especially urea resin/formaldehyde resin and melamine/formaldehyde resin, alkyd resin, phenol resin, polyester resin, polyamide resin, polyvinyl chloride, polyurethane, acryl/melamine, polystyrene, cellulose ether, nitrocellulose, polyacrylate, polyacrylonitrile, polyolefin, and the like are cited. These can be used singly or as mixture. In the present invention as described above, resin system of acryl/melamine is adopted in estimating chroma for convenience.

Also as filler, for example, various kinds of metal foil, titanium oxide, silica and the like can be used. As various additives, for example, surfactant, antiseptic and the like, and as solvent, water and various organic solvents which do not change crystalline state of pigments can be used.

The present invention will be explained as below in detail with examples. Hereinafter, parts and % are all in mass standard, if not mentioned particularly.

EXAMPLE 1

Wet cake of crude pigment of 1,4-diketo-3,6-bis(4-chlorophenyl)pyrrolo[3,4-c]pyrrole produced with well-known method was prepared. The percentage of water content of the wet cake is 68.4%, it had no drying history and was composed of crude pigment with mean particle diameter of 0.10 μm or more and less than 0.20 μm.

158.23 parts of wet cake of the crude pigment (50 parts in solid amount conversion, 108.23 parts of moisture) was suspended stirring with 41.77 parts of water in 600 parts of N-methyl-pyrrolidone in separable wide mouth flask of 1 L volume; the temperature was raised to 110° C. in weak alkaline without containing alkali; then stirred at 110° C. for 4 hours. After 4 hours, 8.4 parts of 10% sodium hydroxide was added and made strong alkaline; further heated stirring at 110° C. for 3 hours. Then, it was cooled to 60° C., filtered at the same temperature; then, wet cake was washed with N-methyl-pyrrolidone and water, and was dried; and 45.7 parts of C. I. Pigment Red 254 was obtained. The pigment had mean particle diameter in the range of 0.40-0.70 μm.

EXAMPLE 2

158.23 parts of wet cake of the same crude pigment as used in example 1 was suspended stirring with 41.77 parts of water and 3.0 parts of aqueous solution of 10% sodium hydroxide in 600 parts of N-methylpyrrolidone in separable wide mouth flask of 1 L volume; the temperature was raised to 110° C. in alkaline containing alkali; then, stirred at 110° C. for 4 hours. After 4 hours, 3.0 parts of 10% sodium hydroxide was added and made strong alkaline, further heated stirring at 110° C. for 3 hours. Then, it was cooled to 60° C., and was filtered at the same temperature; then, wet cake was washed with N-methylpyrrolidone and water, and was dried; and 46.0 parts of C. I. Pigment Red 254 was obtained. The pigment had mean particle diameter in the range of 0.40-0.70 μm.

EXAMPLE 3

158.23 parts of wet cake (50 parts in solid amount conversion, 108.23 parts of moisture) of the same crude pigment as used in example 1 was suspended stirring with 41.77 parts of water in 600 parts of N-methylpyrrolidone in separable wide mouth flask of 1 L volume; the temperature was raised to 110° C. in weak alkaline without containing alkali; then it was stirred at 110° C. for 4 hours. After 4 hours, 6.0 parts of 10% sodium hydroxide was added and made strong alkaline, and was, further heated stirring at 110° C. for 3 hours. Then, it was cooled to 60° C., filtered at the same temperature; then wet cake was washed with N-methylpyrrolidone and water, and was dried; and 45.7 parts of C. I. Pigment Red 254 was obtained. The pigment had mean particle diameter in the range of 0.40-0.70 μm.

EXAMPLE 4

158.23 parts of wet cake (50 parts in solid amount conversion, 108.23 parts of moisture) of the same crude pigment as used in example 1 was suspended stirring with 41.77 parts of water in 600 parts of N-methylpyrrolidone in separable wide mouth flask of 1 L volume and the temperature was raised to 110° C. in weak alkaline without containing alkali; then, it was stirred at 110° C. for 4 hours. After 4 hours, 7.2 parts of 10% sodium hydroxide was added and made strong alkaline, further heated stirring at 110° C. for 3 hours. Then, it was cooled to 60° C. and, filtered at the same temperature; then wet cake was washed with N-methylpyrrolidone and water, and was dried; and 45.9 parts of C. I. Pigment Red 254 was obtained. The pigment had mean particle diameter in the range of 0.40-0.70 μm.

EXAMPLE 5

158.23 parts of wet cake (50 parts in solid amount conversion, 108.23 parts of moisture) of the same crude pigment as used in example 1 was suspended stirring with 41.77 parts of water in 600 parts of N-methylpyrrolidone in separable wide mouth flask of 1 L volume; and the temperature was raised to 110° C. in weak alkaline adding 1.2 parts of 10% sodium hydroxide; then, it was stirred at 110° C. for 4 hours. After 4 hours, 5.1 parts of 10% sodium hydroxide was added and made strong alkaline and was further heated stirring at 110° C. for 3 hours. Then, it was cooled to 60° C., and was filtered at the same temperature; then, wet cake was washed with N-methylpyrrolidone and water, and was dried; and 46.0 parts of C. I. Pigment Red 254 was obtained. The pigment had mean particle diameter in the range of 0.40-0.70 μm.

COMPARATIVE EXAMPLE 1

50 parts of pulverulent body dried from the same crude pigment as used in example 1 was suspended stirring in 250 parts of N,N-dimethylformamide in separable wide mouth flask of 1 L volume; the temperature was raised to 140° C.; then, stirred at 140° C. for 6 hours. After 6 hours, it was cooled to 120° C., filtered at the same temperature, then wet cake was washed with N,N-dimethylformamide and water, and was dried; and 46.3 parts of C. I. Pigment Red 254 was obtained. The pigment had mean particle diameter in the range of 0.40-0.70 μm.

COMPARATIVE EXAMPLE 2

450.0 parts of t-amyl alcohol and 15.45 parts of solid sodium were poured into separable wide mouth flask of 1 L volume equipped with agitating blade made of glass, thermometer, nitrogen inlet tube, reflux condenser, and dropping funnel. The mixture was heated in oil bath at 130° C., and a small amount of iron(III) trichloride was added. After metal sodium vanished perfectly, mixture of 45.51 parts of 4-chlorobenzonitrile, 1.50 parts of 3-methoxybenzonitrile, 50.76 parts of diisopropyl succinimide and 90.0 parts of t-amyl alcohol was added within 2 hours. Then, reaction liquid temperature was reduced to 85° C., and reaction mixture was stirred for 2 hours more.

Temperature was reduced to 40° C., and reaction mixture was poured into next reactor containing mixture of 900 parts of ion exchanged water, 900 parts of methanol, and 360 parts of sulfuric acid at 40° C. within 30 minutes. Then the pigment was conditioned at 40° C. for 18 hours.

After filtering and drying, 45.6 parts of crude pigment powder of red 3,6-bis(4-chlorophenyl)-1,4-diketo-pyrrolo[3,4-C]pyrrole (having same chemical structure as C. I. Pigment Red 254 expressed in the above formula).

40 parts of the crude pigment was suspended stirring in 800 parts of dimethylacetamide in separable wide mouth flask of 1 L volume, and was further heated stirring at 140° C. for 5 hours. After filtering, washing and drying, 37.9 parts of a red pigment was obtained. The pigment had mean particle diameter in the range between 0.40 and 0.70 μm.

COMPARATIVE EXAMPLE 3

50.0 parts of pulverulent body, which the same crude pigment used in experiment 1 was dried, 53.6 parts of 30% sodium hydroxide, and 643 parts of methanol with zirconia beads having diameter of 2.5 mm were rotated for 48 hours by using roll gear table at 20-25° C. in order that zirconia beads should remain on the wall of flask by setting centrifugal force larger than gravity.

After that, zirconia beads were isolated and pigment suspension was filtered. By washing filtered cake with methanol as far as no alkali existed in it, by drying in vacuum desiccator at 80° C.; then, by pulverizing to fine particles, 48.6 parts of red pigment was obtained. The pigment had mean particle diameter less than 0.40 μm.

Concerning each C. I. Pigment Red 254 obtained in examples in the present invention and comparative examples, the hue angle and the chroma by acrylic melamine coatings described below were estimated. In addition, in order to find mass tone of ΔH* and ΔC* of the colored film, as reference standard in the acrylic melamine coating test described below, C. I. Pigment Red 254 of hue angle H* 28.9, and chroma C* 59.8 was used.

(acrylic Melamine Coating Test)

12.00 g of ACRYDIC (registered trademark) 47-712 (acrylic resin, DAINIPPON INK AND CHEMICALS, INC.), 6.00 g of each C. I. Pigment Red 254 obtained in examples and in comparative examples, 24.00 g of mixed solvent (xylene/n-butanol=3/1) and 60 g of glass beads were measured, and mill base was made using dispersion testing machine (Toyo Seiki Seisakusho Ltd.) dispersing for 2 hours. Then, 36.00 g of the same ACRYDIC47-712 as described above, 10.00 g of SUPER BECKAMINE (registered trademark) L-117-60 (melamine resin, DAINIPPON INK AND CHEMICALS, INC.) were added further, and acrylic melamine coating was obtained dispersing for 10 minutes with testing machine for dispersing.

Each acrylic melamine coating obtained above was drawn down over art paper. Drawing down was so performed that on the left, coating of C. I. Pigment Red 254 as reference standard, and on the right, coating of C. I. Pigment Red 254 obtained in example 1-3 were dropped suitably, and applicator of 6 mil (about 0.15 mm) was used. After 1 hour settling, the coated art paper was baked at 140° C. for 20 minute, then was allowed to cooled. It was performed similarly with experiments 4-5, and comparative experiments 1-3.

The three equations (1)-(3) were plotted beforehand in a graph paper where an intersection of the mass tone ΔH* and ΔC* of color coating film in the acrylic melamine coating test is on the X-Y coordinate plane defined with ΔH* as the X-axis and ΔC* as the Y-axis.

As to respective drawn down objects, the colorimetry was performed using spectro photometer of Dator Color International Ltd. in USA (SPECTRA FLASH SF600 PLUS CT), the hue angle ΔH* and the chroma ΔC* were found setting reference standard as base, and plotted on the prepared graph paper (as refer to FIG. 1).

As seen in FIG. 1, it was found that only C. I. Pigment Red 254 of examples 1-5 obtained by adopting production process of the present invention were in the specific surrounded region determined in the present invention described in Table 1, and at the same time were in the surrounded region determined by equations (4)-(6). In the comparative example 1 of each comparative example, C. I. Pigment Red 254 exceeded with the hue angle of ΔH* 0.9, and was necessary to toning with other colors, so the chroma ΔC* after toning became low. In comparative example 2 and comparative example 3, the chroma ΔC* were less than 0.7, and they were inferior to examples of the present invention. All comparative examples were beyond the limits of the specific surrounded region determined by equations (1)-(3) of the present invention.

TABLE 1

|  | hue angle ΔH* | chroma ΔC* |
|---|---|---|
| example 1 | −0.1 | 1.1 |
| example 2 | 0.1 | 1.7 |
| example 3 | 0.2 | 2.2 |
| example 4 | 0.0 | 2.0 |
| example 5 | 0.3 | 2.3 |
| comparative example 1 | 0.9 | 2.7 |
| comparative example 2 | −0.1 | 0.2 |
| comparative example 3 | −0.1 | 0.7 |

As is obvious from the estimation result of the hue angle ΔH* and the chroma ΔC*, C. I. Pigment Red 254 of the present invention could obtain colored objects of high chroma, which chroma ΔC* can not be obtained until now in the range between −0.2 and 0.8 of hue angle ΔH* which is the difference from reference standard. And it was observed that colored objects with excellent chroma were obtained by visual inspection of these coated spreading objects. In particular, in case of ΔH* 0.5 or less, a colored coating film, which ΔC* could attain 1 or more in comparison with reference standard, which showed remarkable effect capable of examining the difference of chroma sufficiently with visual inspection at a nearer hue angle to reference standard.

The effect of the high chroma is not achieved, even if by toning organic pigments other than C. I. Pigment Red 254 with conventional technology.

INDUSTRIAL APPLICABILITY

The present invention provides C. I. Pigment Red 254 which has excellent chroma within the range of intended hue angle without mixing colors, provides the chroma of the pigment, and is resistant to fade by toning like conventional pigments.

The pigment produced by the production method of the present invention shows excellent coloring power, and can be used in various forms of colored plastic moldings, coloring varnishes, oil or water-borne coatings, printing inks, lacquer, and the like.

Further, the production method according to the present invention is the production method for C. I. Pigment Red 254, including a heating process with 1,4-diketo-3,6-bis(4-chlorophenyl)-pyrrolo[3,4-c]pyrrole in strong alkaline aprotic polar organic solvent at 100-130° C. for 2-10 hours, which comprises the step of, prior to the heating process, beforehand heating at 100-130° C. in neutral or weaker alkaline aprotic polar organic solvent, the mean particle diameter is larger than the particle diameter before heating. So, not only C. I. Pigment Red 254 can be obtained easily with a higher chroma than conventional C. I. Pigment Red 254, but also can be saved load and large power such as grinding for functioning the crude pigment as the colorant, further grinding medium is unnecessary; therefore, contamination with foreign substances can be restricted to a minimum by the grinding. Furthermore, the present invention has an excellent effect of showing no deterioration of storage stability in case of preparing coatings and the like which is caused by the extremely wide particle diameter distribution obtained by grinding.

What is claimed is:

1. C. I. Pigment Red 254, wherein the ΔH* and ΔC* of a color coating film in an acrylic-melamine coating test is within a surrounded region determined by following three equations:

[Equation 1]
$$y=7.00x+2.20 \quad \text{Equation (1)}$$

[Equation 2]
$$y=1.07x+2.20 \quad \text{Equation (2)}$$

[Equation 3]
$$y=2.32x+1.26 \quad \text{Equation (3),}$$

on an X-Y coordinate plane to which the ΔH* is defined as the X-axis and the ΔC* is defined as the Y-axis.

2. C. I. Pigment Red 254, wherein the ΔH* and ΔC* of a color coating film in an acrylic-melamine coating test is within a surrounded region determined by following three equations:

[Equation 4]
$$y=9.00x+2.20 \quad \text{Equation (4)}$$

[Equation 5]
$$y=1.10x+2.20 \quad \text{Equation (5)}$$

[Equation 6]
$$y=2.92x+1.29 \quad \text{Equation (6)}$$

on an X-Y coordinate plane to which the ΔH* is defined as the X-axis and the ΔC* is defined as the Y-axis.

3. A production method for C. I. Pigment Red 254 having a mean particle diameter of 0.30-0.80 μm comprising heating 1,4-diketo-3,6-bis(4-chlorophenyl)pyrrolo[3,4-c]pyrrole having mean particle diameter of 0.10-0.20μm in a strong alkaline aprotic polar organic solvent at 100-130° C. for 2-10 hours, further comprising the step of, heating the 1,4-diketo-3,6-bis(4-chlorophenyl)pyrrolo[3,4-c]pyrrole at 100-130° C. in neutral or weaker alkaline aprotic polar organic solvent prior to heating in the strong alkaline aprotic polar organic solvent.

4. The production method for C. I. Pigment Red 254 according to claim 3, wherein the alkali contained in the aprotic polar organic solvent prior to heating is present in a concentration of 0-0.07 parts per 100 parts of the aprotic polar organic solvent and the alkali contained in the aprotic polar organic solvent after heating is present in a concentration of 0.02-0.15 parts per 100 parts of the aprotic polar organic solvent.

5. The production method for C. I. Pigment Red 254 according to claim 3, wherein the aprotic polar organic solvent is a hydrophilic aprotic polar organic solvent having nitrogen-containing heterocyclic ring, and the alkali is an inorganic alkali soluble in the aprotic polar organic solvent and water-soluble.

6. The production method for C. I. Pigment Red 254 according to claim 4, wherein the aprotic polar organic solvent is a hydrophilic aprotic polar organic solvent having nitrogen-containing heterocyclic ring, and the alkali is an inorganic alkali soluble in the aprotic polar organic solvent and water-soluble.

* * * * *